(12) United States Patent
Obrea et al.

(10) Patent No.: US 8,560,457 B2
(45) Date of Patent: Oct. 15, 2013

(54) ENHANCED NETWORK SERVER AUTHENTICATION USING A PHYSICAL OUT-OF-BAND CHANNEL

(75) Inventors: Andrei Obrea, Seymour, CT (US); Arthur J. Parkos, Southbury, CT (US); Gary G. Hansen, Newtown, CT (US); Matthew J. Campagna, Ridgefield, CT (US); George M. Macdonald, New Canaan, CT (US)

(73) Assignee: Pitney Bowes Inc., Stamford, CT (US)

( * ) Notice: Subject to any disclaimer, the term of this patent is extended or adjusted under 35 U.S.C. 154(b) by 1765 days.

(21) Appl. No.: 11/541,279

(22) Filed: Sep. 30, 2006

(65) Prior Publication Data
US 2008/0091618 A1   Apr. 17, 2008

(51) Int. Cl.
*G06Q 20/00* (2012.01)
(52) U.S. Cl.
USPC .................. 705/67; 705/64; 705/75; 705/76
(58) Field of Classification Search
USPC .......................................................... 705/38
See application file for complete search history.

(56) References Cited

U.S. PATENT DOCUMENTS

| | | | |
|---|---|---|---|
| 5,311,596 A | 5/1994 | Scott et al. | |
| 5,668,876 A | 9/1997 | Falk et al. | |
| 5,732,137 A | 3/1998 | Aziz | |
| 6,038,549 A | 3/2000 | Davis et al. | |
| 6,049,785 A * | 4/2000 | Gifford | 705/39 |
| 6,662,228 B1 | 12/2003 | Limsico | |
| 6,889,211 B1 * | 5/2005 | Yoshiura et al. | 705/58 |
| 6,907,530 B2 | 6/2005 | Wang | |
| 6,934,858 B2 | 8/2005 | Woodhill | |
| 6,970,853 B2 | 11/2005 | Schutzer | |
| 6,983,381 B2 | 1/2006 | Jerdonek | |
| 7,010,684 B2 | 3/2006 | DeTreville | |
| 7,062,462 B1 * | 6/2006 | Ireland et al. | 705/38 |
| 7,065,341 B2 | 6/2006 | Kamiyama et al. | |
| 7,072,062 B2 | 7/2006 | Eguchi | |
| 7,100,049 B2 | 8/2006 | Gasparini et al. | |
| 2004/0168083 A1 | 8/2004 | Gasparini et al. | |
| 2005/0268100 A1 | 12/2005 | Gasparini et al. | |
| 2006/0020812 A1 | 1/2006 | Steinberg et al. | |
| 2006/0041755 A1 | 2/2006 | Pemmaraju | |

OTHER PUBLICATIONS

Bestätigungsnummer—Internet Article—XP-002462300—Jul. 11, 2005.
Wiesmaier, et al. "Outflanking and Securely Using thePIN/TAN—System" Proceedings of the 2005 International Conference on Security and Management, SAM 2005, Las Vegas, Nevada, USA, Jun. 20-23, 2005, pp. 313-319.

\* cited by examiner

*Primary Examiner* — Calvin L Hewitt, II
*Assistant Examiner* — Khalif Muhammad
(74) *Attorney, Agent, or Firm* — Michael J. Cummings; Charles R. Malandra, Jr.; Steven J. Shapiro

(57) ABSTRACT

Systems and methods for increasing user trust by authenticating an electronic commerce server over an electronic communications channel using information received through an out-of-band communication in a physical communications channel are described. In one configuration, a paper bill is sent to a user by physical mail delivery and it includes challenge and response data used to authenticate the electronic commerce server over the electronic communications channel.

11 Claims, 5 Drawing Sheets

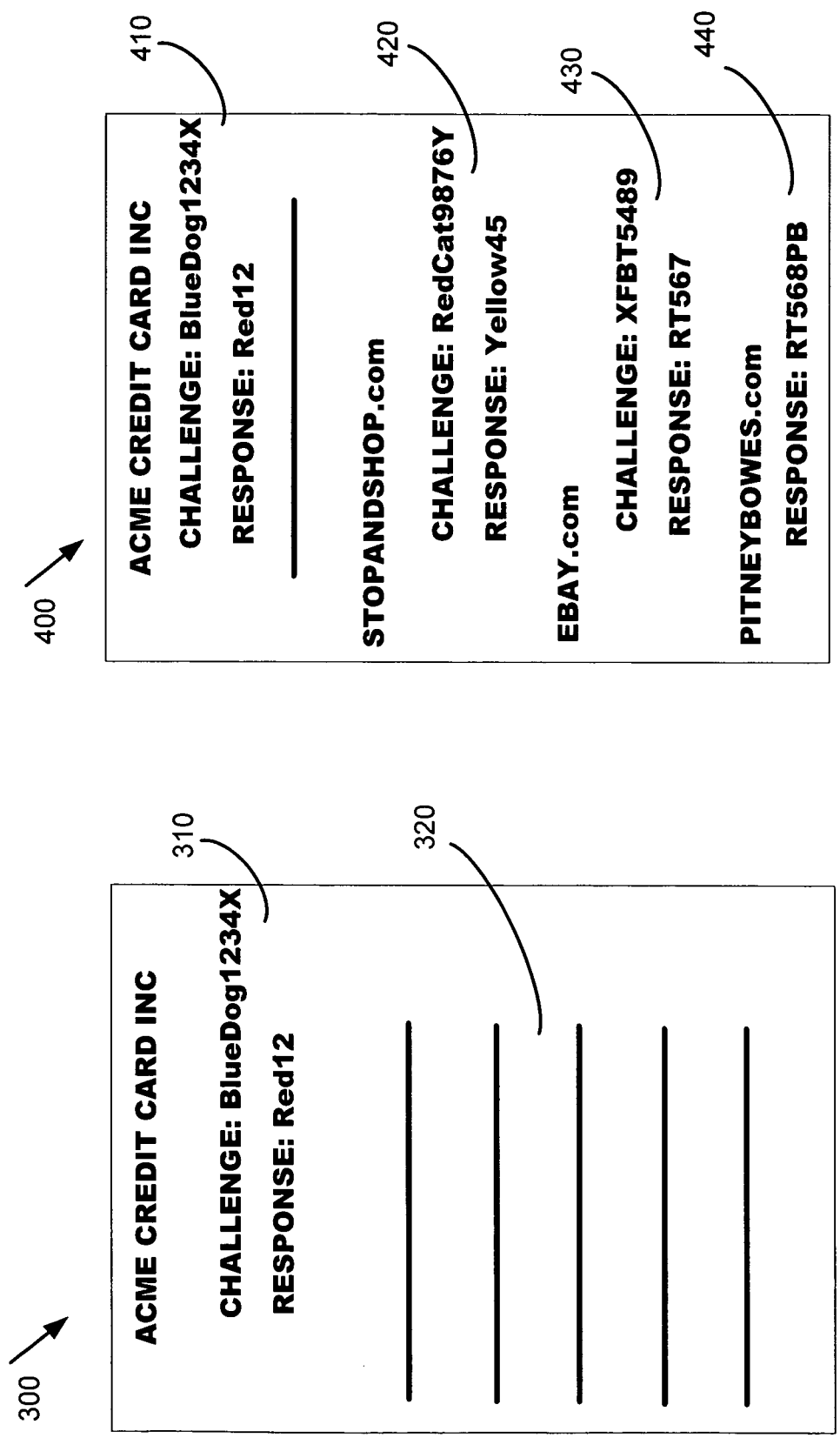

ENHANCED NETWORK SERVER AUTHENTICATION USING A PHYSICAL OUT-OF-BAND CHANNEL

FIELD OF THE INVENTION

The present invention relates to authentication systems and more particularly systems and methods for authenticating an electronic commerce server over an electronic communications channel using information received in an out-of-band physical communication.

BACKGROUND OF THE INVENTION

One of the factors thought to limit the growth of electronic commerce today is the lack of sufficient trust on the part of customer in the security and integrity of the electronic commerce systems employed.

The Internet and the World Wide Web provide users with a robust communications network enabling communications with computers throughout the world. It is now increasingly common for customers to communicate and place orders with distant vendors using the Internet. When customers shop at local stores, shop keepers know the customer or if necessary may inspect identification documents to authenticate the customer if needed. However, since the Internet communications are not in person, it may be necessary to use some other authentication system.

Much of the effort undertaken in the electronic authentication area has concerned authenticating the remote user or customer to the electronic commerce site and there are many such systems available for authenticating the user. If the web site is duped into believing it is communicating with one entity, but it is in fact communicating with a different entity, it may transfer money or other valuables or goods to the wrong party during the perpetration of a fraud. Similarly, such a duped web site might provide access to sensitive information to the wrong entity. Since such electronic commerce vendors may loose significant funds in such substitution attacks, many vendors take precautions to authenticate the user. Elaborate user authentications systems have been proposed including those using out-of-band authentication communications paths employing biometric authentication response to challenges that are required before access to the in-band electronic system is provided. For example, U.S. Patent Application Publication 2006/0041755 A1 entitled Multichannel Device utilizing a Centralized Out-of-Band Authentication System (COBAS) and published Feb. 23, 2006 describes biometric user authentication systems. Such systems are directed to authenticating a user to the web server.

Considering the converse server authentication process, in the scenario of a bricks-and-mortar shop, there is little chance that the customer will be duped into dealing with a party who is not the shop owner. Furthermore, delivery may be a prerequisite of payment for an in-person brick-and-mortar shopping experience. The user has few options available for authenticating the electronic commerce web server (in other words, making sure that the user is communicating with the organization that it believes it is communicating with). The systems that are available are not terribly effective since they are not easy to use. Unfortunately, in Internet commerce, Phishing attacks are becoming increasingly common whereby an unsuspecting user will be redirected to a fraudulent location using a link that the user believes points to an authentic and respectable business. Once the user reaches the fraudulent web site, the user is induced into providing usernames and passwords to the perpetrator of the fraud. After the perpetrator has obtained the actual authentication information, they use that information at the authentic electronic commerce site in an identity theft attack. Since the perpetrator then possesses the authentication information, the electronic commerce site is duped into believing that it is dealing with the actual customer. Furthermore, it is even possible that the actual Internet address of a respectable business could be high-jacked by a fraudulent party. Accordingly, there is a need to provide the user with a straightforward mechanism to authenticate the electronic commerce site before providing confidential information such as usernames, passwords and credit account information.

There have unfortunately been such a large number of attacks on electronic commerce systems including Phishing attacks that companies are beginning to take efforts to combat such abuses. In order to take measures to protect against the Phishing attack problem, some web sites provide a cryptographic certificate to allow the user to verify that the web site is authentic. However, the process of using such certificates is complicated and not readily understood by the average electronic commerce user. Thus, such conventional certificate methods that allow a user to authenticate the web site may be largely ineffective because they are too difficult to use. Accordingly, the average customer with average ability is unable to determine with a high degree of confidence and certainty that the web site he is navigating is authentic. Additional systems have also been proposed. For example, in U.S. Pat. No. 7,100,049 B2, issued Aug. 29, 2006 to Gasparini, et al., entitled Method and Apparatus for Authentication of Users and Web Sites, systems for authentication of web sites using a single in-band communications channel are described in response to Phishing attacks that display information recognizable to the user. In a typical Phishing attack, a fraudulent email is sent to a user purportedly from a financial institution that the user is a customer of. The email contains a link that appears to lead to an authentic financial institution, but it actually points to a fraudulent site that attempts to elicit confidential information.

When such Phishing attacks are successful, both the users and the electronic commerce businesses suffer. They may suffer losses of time and productivity in rectifying the situation, money and they may suffer damage to their reputation or creditworthiness standing. Accordingly, there is a need for a system and method that can securely authenticate a web site to a user that is easy to use. Additionally, there is a need to provide convenient out-of-band communications to facilitate web site authentication such as by a challenge response system.

SUMMARY

The illustrative embodiments of the present application describe enhanced authentication systems including systems and methods for increasing user trust by authenticating an electronic commerce server over an electronic communications channel using information received through an out-of-band communication in a physical communications channel.

In one illustrative configuration, an electronic commerce vendor sends an out-of-band communication to a customer including a challenge indicator such as a code or symbol and a corresponding response code or indicator. When the user navigates to the electronic commerce web site, the web site may receive identification and/or authentication information related to a user or may simply request a challenge indicator. The web site then displays a response indicator such as a code, symbol, image or other response data that the user may compare with the out-of-band communication to authenticate the web site. In an illustrative embodiment described herein, the out-of-band communication includes a physical shipment/mailing to the user.

In yet another illustrative embodiment, the system utilizes periodic physical shipments such as credit card statement mailings to provide the user with periodically updated response data and/or challenge data. Such a mailing may include challenge and/or response data for a plurality of vendors such as providing challenge and/or response data for a plurality of vendors having charged the customer on that credit card for the corresponding billing cycle. Several additional illustrative configurations are described below.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 3 is a top plan view of a physical communication including challenge and response data according to an illustrative embodiment of the present application for use with the environment of FIG. 1.

FIG. 4 is a top plan view of a physical communication including a plurality of challenge and response data sets according to an illustrative embodiment of the present application for use with the environment of FIG. 2.

DETAILED DESCRIPTION

Figure 1:
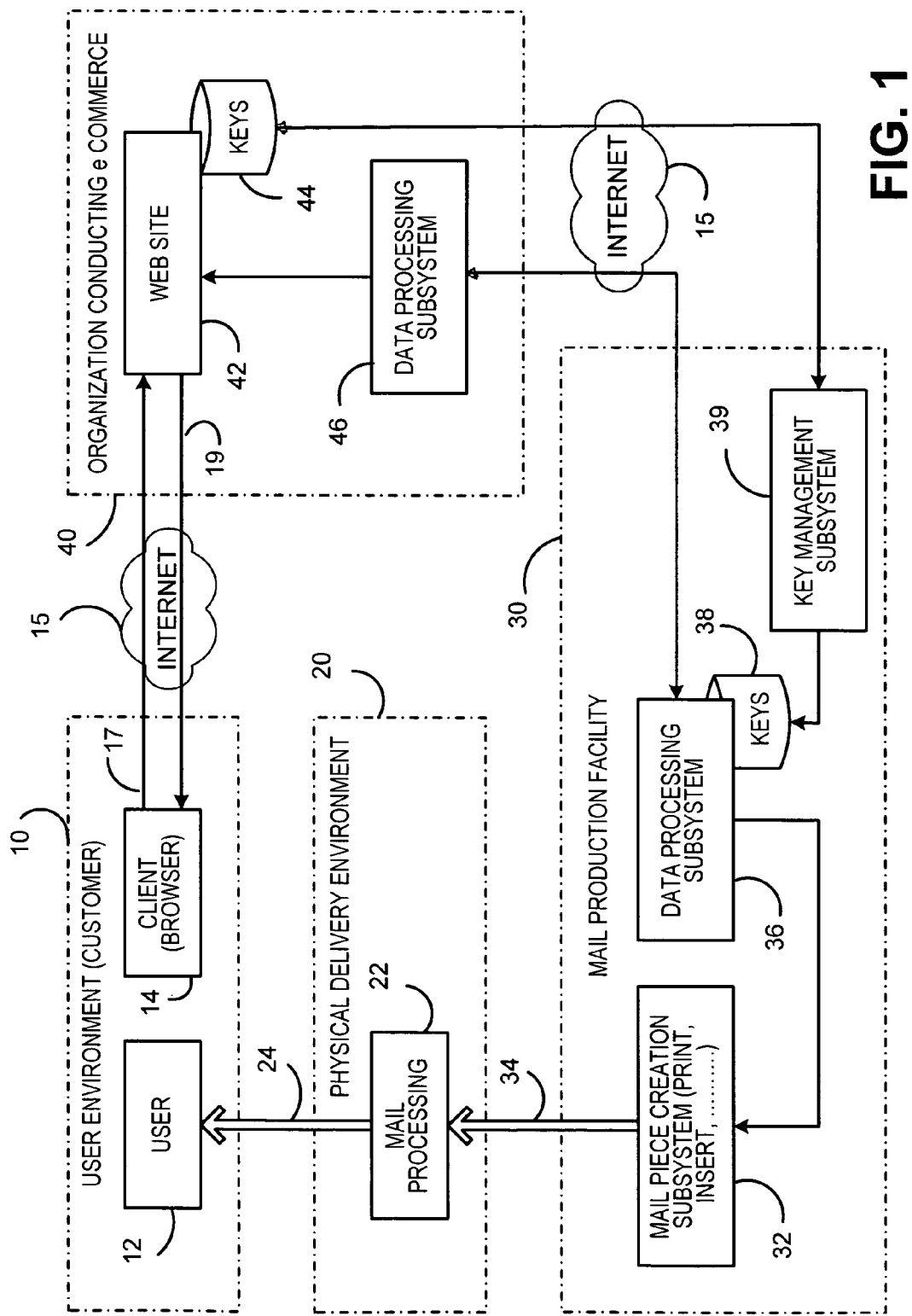
FIG. 1 is a schematic diagram of an authentication environment including systems for authenticating an internet server to a user by using an out-of-band physical delivery channel according to an embodiment of the present application.

The illustrative embodiments of the present application describe enhanced authentication systems including systems and methods for increasing user trust by authenticating an electronic commerce server over an electronic communications channel using information received through an out-of-band communication in a physical communications channel. The physical communications channels are described as the United States Postal service (USPS) delivery system, but other physical delivery systems including courier services may be utilized. Similarly, the electronic communications channels described utilize the Internet, but some or all of the electronic communications channels may be private networks, telephony networks or other data communications channels.

The illustrative embodiments of the present application provide a layer of security for a subset of electronic communications by providing an additional method for verifying that a particular web site being utilized by a user is authentic. The illustrative systems and methods described employ an additional communications channel or out-of-band channel such as the physical delivery mail communications channel. The embodiments provide improved authentications systems by modifying the already present physical mail delivery systems used such as delivery of credit card account statements to users, delivery of utility bill statements and other account management statements.

A challenge and response authentication system is described wherein the system securely generates and distributes a matched pair of challenge/response data such as alphanumeric strings. The challenge/response data is communicated through a secondary channel to the user such as the physical mail. For example, the periodic bill or statement sent from a vendor to the customer is modified to include the challenge/response data printed on the bill or printed on an insert mailed with the bill. The challenge/response data is printed in an accessible easy to find location such as the front page of the bill or an insert. In order to authenticate a web site, the user types or scans in the challenge data into the appropriate challenge field input box on the web site page. In response to receiving the challenge data, the web site determines the appropriate response such as by calculating the response using the appropriate algorithms and cryptographic data such as keys. In alternatives, the web site determines the response using a lookup database. The response is then displayed to the user in the browser so that the user can verify the web site response against the response data received in the out-of-band physical communication included with the bill.

In this embodiment, the user has an established relationship with the vendor and can authenticate the printed communication that includes the challenge/response data and that is likely to contain personal information known to the user such as itemized transactions or telephone calls that the user will recall making. The challenge string may be completely random, but could alternatively be an easy to remember string such as an email address, name, user name, account number or the like. The response to the challenge in an illustrative embodiment is then calculated using a mathematical one-way function such as a hash function. A sufficiently irreversible subset of the hash may be utilized as the response data. A relatively simple illustrative implementation calculates a hash of the challenge string concatenated with a secret key. The secret key is generated in a key management system and may be securely distributed to both the mail production facility and the web site using a VPN. The challenge/response pairs are calculated either at the mail production facility based upon cryptographic keys, or they are calculated at a remote site and securely transmitted to the mail production facility. The mail production facility prints both the challenge and response data on the statement or insert and then generates that mail piece that is sent to the customer. The web site stores the key and calculates the response to the challenge in real time using the same algorithm that takes as input the key and the challenge provided by the user. Alternatively, a public key system may be utilized or the system may calculate and store all challenge/response pairs so that they can be looked up rather than recalculated.

Referring to FIG. 1, a schematic diagram of an authentication environment including systems for authenticating an internet server to a user by using an out-of-band physical delivery channel according to an embodiment of the present application is shown. The User Environment 10 is typically a home computing environment with Internet connection for use by a consumer or customer intending to access an electronic commerce server. The user 12 utilizes a PC with browser client 14 that is connected to the electronic commerce organization 40 using the Internet 15. The Internet communications may be in the clear or may be secured by SSL supported by a certificate or purportedly secured by SSL in a rouge system. As described above, it is common for the electronic commerce organization 40 to authenticate the user 12 such as by using a cookie, secure cookie, username/password, biometric or physical token. Due to the Phishing attack problem, it may be advantageous for the user to be able to have some level of trust by using some level of authentication of the electronic commerce web site. Here, the user 12 receives an out-of-band physical communication, delivered mail piece 24. The client browser 14 is used to send a challenge 17 to the web site 42. Using the systems and methods described herein, the web site 42 sends a response 19 to the user. The user then compares that response to the one received in the out-of-band physical communication.

In this illustrative embodiment, the electronic commerce organization 40 is a representative ACME CREDIT CARD COMPANY. The company 40 utilizes a back end data processing system 46 that provides web content to the web site 42 using a LAN connection. The back end data processing system 46 sends statement data to the external printing and mailing vendor having mail production facility 30. The statement data is sent to the data processing subsystem 36 at the mail production facility 30. In a conventional mail production facility, the statements would then be printed and fed to an insertion statement for mail piece creation. The finished mail pieces would then be inducted into the postal system. Here, the mail production facility 30 includes a Key Management System 39 that is used to facilitate creation of challenge response pairs. The data processing system 36 includes a keys database 38 that stores the keys provided by the key management system 39. The data processing system then creates challenge/response statements that it sends to the mail piece creation system 32 for printing and mail piece insertion and finishing. The key management system 39 also sends the keys to the web site server 42 for storage in the related keys database 44.

When the user 12 sends the challenge, the web site server 42 may use the keys database 44 to generate the response. Additionally, the web site 42 may use the geocoding system 48 to ensure that the user challenge originated from a location consistent with the physical delivery location for that user. As shown in FIG. 1, the out-of-band communications channel includes the physical delivery channels 34, 24 and the postal environment 20 using mail processing systems 22. After the mail production facility creates the mail pieces, they are inducted into the USPS delivery system using physical delivery channel 34. Mail is a traceable and expensive channel compared to email and is therefore a more suitable out-of-band channel since Phishing fraudsters typically rely on high volume free emails to attract a small number of duped individuals. Furthermore, the systems and methods described provide a reuse of the physical mail channel used for statement delivery, trusted correspondence or other mailings to provide a secure and economical out-of-band authentication system.

In this illustrative embodiment, the keys are used by the mail production facility 30 to create responses to each challenge. In a first step, the system creates a challenge. The challenge may include random strings that are long enough to create a large sparse set that would be difficult to attack using brute force and/or dictionary scanning. Cryptographic keys and either a symmetric encryption algorithm, like the Advanced Encryption Standard (AES), or a secure hash algorithm, like SHA2 are utilized. Here, AES is utilized. In a second step, the system combines the key and challenge, adding a possible extra value or nonce, and then calculates a response, using the selected algorithm. Alternatively, they algorithm could be an asymmetric algorithm like elliptic curve digital signature scheme or an RSA scheme. In a third step, the system selects a subset of the digital signature as a response using a truncation method. The key might be a simple phrase that might be transmitted by telephone such as "Pluto is no longer a planet".

Figure 2:
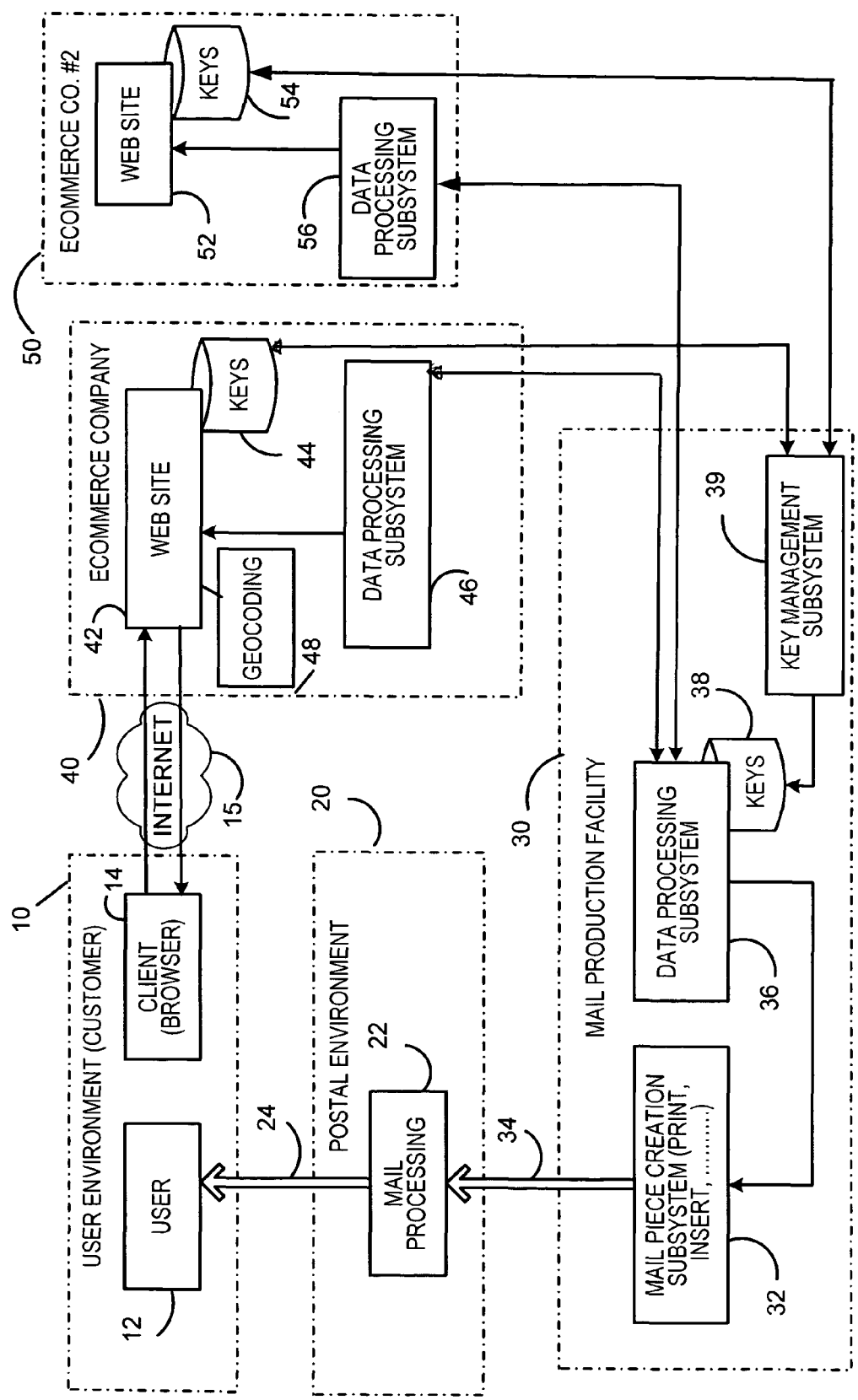
FIG. 2 is a schematic diagram of an alternative authentication environment including systems for authenticating a plurality of internet servers to a user by using a single out-of-band physical delivery channel communication according to an embodiment of the present application.

Referring to FIG. 2, a schematic diagram of an alternative authentication environment including systems for authenticating a plurality of internet servers to a user by using a single out-of-band physical delivery channel communication according to an embodiment of the present application is shown. As shown above, the initial embodiment requires that the electronic commerce vendor send a physical communication to the user. While a special purpose challenge/response physical communication could be sent to a user, such a method would be relatively costly. Accordingly, for vendors that periodically send physical communications to their customers including credit card companies and utilizes, it would be advantageous to implement the challenge/response methods described herein with the regularly scheduled mailings. Accordingly, it may be useful for electronic commerce vendors that do not regularly correspond by mail with customers to engage third parties to provide a challenge/response facility. Furthermore, there would be economies of scale and advertising opportunities presented in such a system. For example, a periodic statement generating vendor such as a credit card vendor may offer a service to retail vendors that do not routinely send physical statements to end users. In FIG. 2, the environment is similar to that shown in FIG. 1. However, in FIG. 2, the second electronic commerce vendor 50 is provided as a representative company for the plurality of such vendors that may subscribe to such an authentication service. The second ecommerce vendor 50 includes a web site server 52 with associated keys database 54 and a back end data processing system, 56 that is in communication with the mail production facility 30 using the Internet 15.

The second electronic commerce vendor 50 may represent a retail store that is frequently used by the customer but that does not send physical mail to the customer such as the STOP AND SHOP food market chain. In this embodiment, the food market contracts with the Credit Card Company and/or mail processing vendor to provide the authentication method to its customers. When a customer incurs a charge to the credit card at the food market, that statement will include a challenge/response pair for the food market web site.

Additionally, retail vendors used by the consumer in the past several months may also be included in the program and associated challenge/response pairs provided on the appropriate statement insert. Furthermore, the second electronic commerce vendor 50 may represent a retail store that has not yet been used by the customer as an advertised service. In another alternative, the customer may provide a preferred vendor list or indication to the credit card company or mail processing vendor suggesting that a challenge/response pair for a particular vendor or a vendor from a particular class of merchants be included.

There are many methods to provide a multiple party C/R delivery mechanism and certain illustrative architectures are described. Initially, there needs to be a level of trust between the main merchant that will deliver the multi-vendor C/R publication and the subscribing vendors. The subscribing vendors may include Stop & Shop, Ebay and Pitney Bowes as shown in FIG. 4. If the mail processing facility is trusted and used to provide multiple vendor C/R inserts, the C/R pairs may be generated without association with the customer so that the C/R pairs can be sent to the additional vendors without the additional vendors knowing which of their customers are using the primary electronic commerce vendor's services. The third party vendor service may be provided as a complimentary service or as a paid service provided by either the main electronic commerce vendor represented by credit card company 40 or the mail processing, bill statement processing company 30 using known payments schemes such as impression counting or the like.

Referring to FIG. 3, a top plan view of a physical communication 300 including challenge and response data according to an illustrative embodiment of the present application for use with the environment of FIG. 1 is shown. The communications 300 includes a credit card bill from the illustrative ACME CREDIT CARD COMPANY. It includes a challenge/response pair 320 in an easy to find location of the bill and it also includes personalized transaction data 320 reflecting charges made by the user. The user can authenticate the physical mailing using known characteristics of the document including known template features and by the existence of known transaction data in the document.

Referring to FIG. 4, a top plan view of a physical communication insert 400 including a plurality of challenge and response data sets according to an illustrative embodiment of the present application for use with the environment of FIG. 2 is shown. The insert 400 is an insert to the Acme Credit Card company bill and includes a challenge/response data set for Acme 410. The insert 400 includes item 420 identifying a vendor that the user charged purchases to in the accompanying credit card statement and includes challenge/response data for that vendor. Alternatively, vendors used by the consumer in the past may also be included on the insert.

The insert 400 also includes the identity and challenge response data 430 for an additional vendor that was not used by the customer. It is placed by the statement provider as an advertised service. The insert 400 also includes the identity and response only data 440 for another vendor. The additional vendor may be identified by the user on a list of preferred vendors or vendor categories for which the user would like to receive challenge/response data. Such a vendor would only provide response data if it had an established relationship with the customer and could use the customer authentication at the web site as the challenge if the challenge and/or response authentication data is associated with particular users. The user authentication might include a secure cookie or a username/password.

Figures 5, 6:
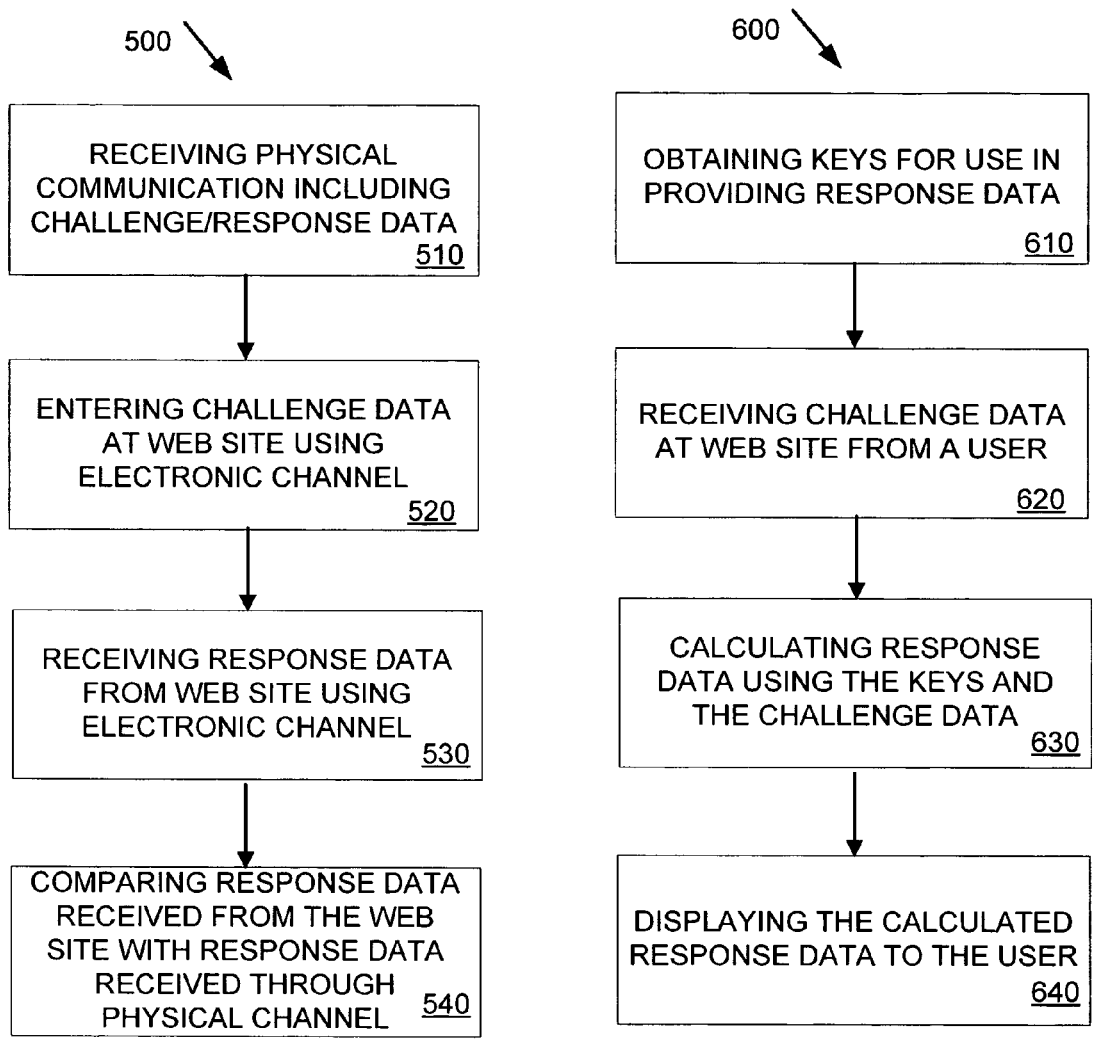
FIG. 5 is a flowchart showing an illustrative user process for authenticating a web site according to an illustrative embodiment of the present application.
FIG. 6 is a flowchart showing an illustrative server process for providing web site authentication data to a user according to an illustrative embodiment of the present application.

Referring to FIG. 5, a flowchart showing an illustrative user process 500 for authenticating a web site according to an illustrative embodiment of the present application is shown. In step 510 the user receives a physical communication including challenge/response data. In the illustrative embodiment, the physical communication is a statement such as a credit card statement. The user is able to authenticate the statement because he knows that he has an account with that bank, he recognizes the format and he recognizes the charges listed in the itemized statement. In some of the described alternatives, the statement includes an insert with challenge/response data for use with other vendors that the statement provider. In step 520, the user accesses the vendor web site using an electronic communications channel such as the Internet. The user then enters the challenge data such as a challenge string into the appropriate challenge data input box presented by the web site. In step 530, the user receives the response data from the web site over the electronic communications channel. In step 540 the user compares the response data received from the web site over the electronic communications channel with the response data received through the physical delivery channel. The user may then decide if he trusts the web site based upon the authentication provided by the comparison.

Referring to FIG. 6, a flowchart showing an illustrative server process 600 for providing web site authentication data to a user according to an illustrative embodiment of the present application is shown. In step 610, the server obtains keys for use in providing response data. The keys may be obtained using a secure communications channel with the key management system such as a VPN. In an alternative, the server may generate the keys. In yet another alternative, the response data may instead be obtained through a lookup database. In step 620, the server receives a challenge request at the web site from a user across an electronic communications channel. In step 630, the server then calculates the response data using the appropriate key or obtains the response data using a lookup operation. Thereafter, in step 640, the server displays the response data to the user across the electronic communications network.

Figure 7:
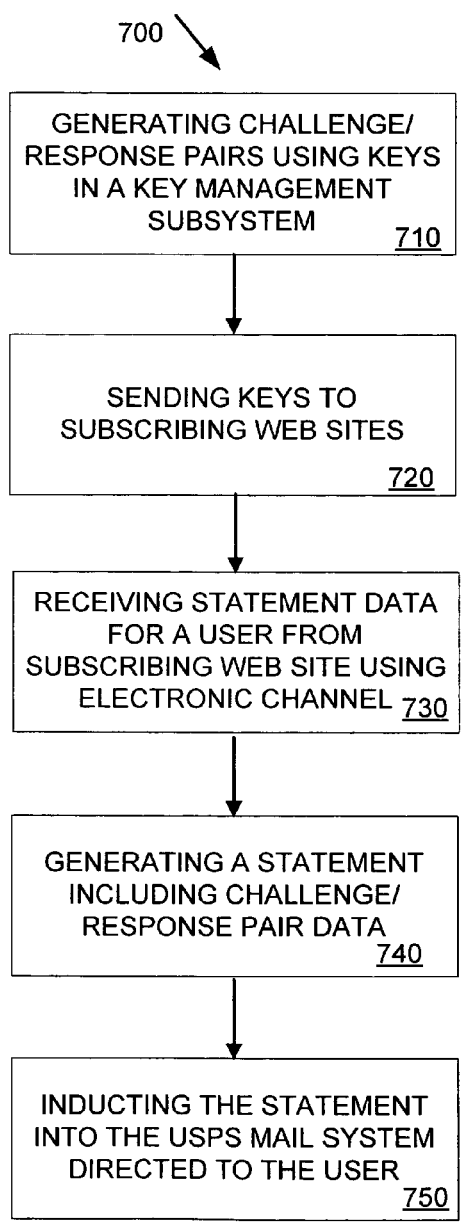
FIG. 7 is a flowchart showing an illustrative mail creation process for providing an out-of-band physical communication to a user including authentication information according to an illustrative embodiment of the present application.

Referring to FIG. 7, a flowchart showing an illustrative mail creation process 700 for providing an out-of-band physical communication to a user including authentication information according to an illustrative embodiment of the present application is shown. In step 710, the data processing subsystem 36 generates challenge/response (C/R) pairs using the appropriate key. In step 720, the system sends the keys to the subscribing web sites. In the alternative decentralized embodiment, the vendor that is creating the statements does all of the key generation and modified statement generation in-house and would merely store the keys for later use. In step 730, the mail creation vendor receives statement data for a particular user from the subscribing web site using a secure electronic channel. In step 740 the system generates a statement including the challenge/response pair data. In an alternative, the challenge/response data is printed on an insert that is provided with the statement. In step 750, the generated statement is inducted into the physical delivery system such as the USPS system.

In an alternative applicable to any of the embodiments herein, the mail creation and C/R pair generation is done in-house at the credit card company or other electronic commerce vendor that is providing the web server authentication service to its customers. In the alternative embodiment, the C/R pairs are linked to a user and the user would have to authenticate to the web site before even the challenge would be accepted. While there would be a small margin of additional security, such a system would entail more computing complexity and is therefore an alternative. If a rouge website were to acquire a small number of C/R pairs, a small number of users could be duped by the rouge site. Since the keys are securely protected, only a small number of C/R pairs could practically be intercepted unless a large number of customers participated or a wide spread physical authentication communication interception was perpetrated.

In another alternative embodiment applicable to any of the embodiments herein, only one entity has the keys and generates the C/R pairs so that there is less risk of keys being compromised. The C/R pairs are then computed at the primary site that can be either the main electronic commerce company or the mail production facility. The subscribing sites can then receive a list of the C/R pairs for lookup purposes during the web site authentication process. Location based checks could be put in place to reduce this risk. Also, since the statements are sent periodically to the users, time criteria may be used as a defense against stolen C/R pairs and the C/R pairs could time out after one month, two months or other reasonable time. If stolen or compromised C/R pairs became an issue that could not easily be dealt with otherwise, this alternative could be implemented. Since each challenge is different and each challenge may be selected to be from a large and sparse range, the likelihood of a brute force attack succeeding is small.

Figure 8:
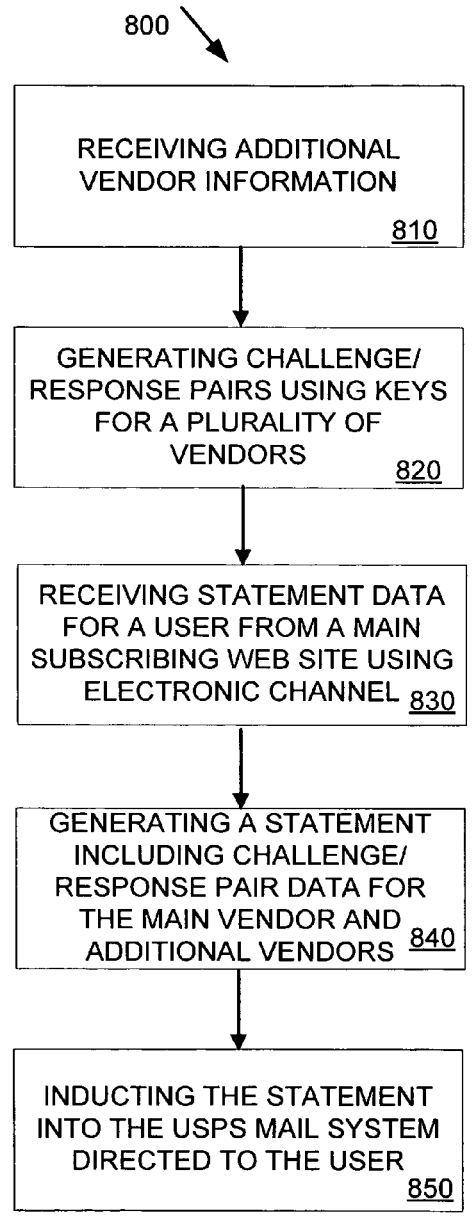
FIG. 8 is a flowchart showing an illustrative server process for providing web site authentication data to a user for a plurality of web sites according to an illustrative embodiment of the present application.

Referring to FIG. 8, a flowchart showing an illustrative server process 800 for providing web site authentication data to a user for a plurality of web sites according to an illustrative embodiment of the present application is shown. In step 810, the mail creation vendor receives additional vendor information. The additional vendor information is identification information for vendors such as retail vendors that subscribe to a service to have their data ride along with the main vendor statements. For additional vendors that do not regularly send periodic statements to their customers, this provides a mechanism for an efficient physical out-of-band channel. Several mechanisms for identifying such third party additional vendors for inclusion have been described herein. In step 820 the system generates challenge/response pairs using keys for a plurality of vendors. Alternatively, the challenge/response pairs may be obtained from a lookup database or provided by the main subscribing web site vendor. In step 830, the statement creation system receives statement data for a user from the main subscribing web site using a secure electronic channel. In step 840, the system generates a modified statement including challenge/response pair data for the main vendor and one or more additional vendors. In step 850, the modified statement is inducted into a physical delivery system such as the USPS delivery system.

The mail piece creation systems described may be obtained from Pitney Bowes Inc. of Stamford, Conn. and include the PITNEY BOWES APS inserter system. Similarly, statement printing, customization and creation services may be obtained from Pitney Bowes Inc. Geocoding and statement generation systems described such as the customizable DOCI suite and the GEOSTAN system may be obtained from Group 1 Software, a Pitney Bowes Company, of Lanham, Md. Encryption, digital signature and challenge/response data creation systems described may be obtained from the RSA division of EMC of Bedford, Mass. Alternatively, the described systems may be developed using general purpose software development tools including Java and/or C++ development suites. The server systems such as a SUN FIRE T2000 and associated web server software such as SOLARIS and JAVA ENTERPRISE and JAVASYSTEM SUITES may be obtained from several vendors including Sun Microsystems, Inc. of Santa Clara, Calif. PC and user computing systems described may include WINDOWS/INTEL architecture systems running WINDOWS and INTERNET EXPLORER BROWSER such as the DELL DIMENSION E520 available from Dell Computer Corporation of Round Rock, Tex. While the electronic communications networks have been described as Internet connections, other communications channels such as Local and Wide Area Networks, telephony and wireless communications channels may be used. Furthermore, while the USPS physical delivery system has been described, other physical delivery systems such as courier systems may be used.

In an alternative applicable to any of the embodiments herein, the challenge and/or response data may instead include an invitation such as a secure link for the user to provide response data such as a personal code or image that the user will recognize. While the challenge/response data described in the embodiments herein has been largely described as comprising alphanumeric strings, other systems may be used. In an alternative applicable to any of the embodiments described herein, the challenge/response data is not limited to alphanumeric strings secured by cryptography. For example, the challenge/response data may include human readable characters or may utilize a variety of additional technologies and encoded symbologies including barcodes, glyphs, user photographs and special metameric inks. In such alternatives, the appropriate devices for reading such symbols are utilized to interface with the user system. Furthermore, the challenge may be the user presenting and/or authenticating to the web server. Once the web server authenticates the user such as by a cookie, secure cookie, username/password, biometric or physical token, the web site then presents the response. Such an alternative challenge must be first obtained in a secure fashion. The response may be data sent to the user through the physical channel or may be data such as an image previously securely selected by or obtained from the user in response to a physical channel communication. In another alternative, the electronic commerce organization may generate the challenge/response pairs and send them to the mail creation vendor. In such a system, the electronic commerce organization would not have to send the keys to the mail creation vendor.

In an alternative applicable to any of the embodiments described herein, the out-of-band communications channel may instead utilize other communications channels such as manual or automatic telephonic communications, facsimile communications, instant messaging, or SMS communications. The client software has been described as the INTERNET EXPLORER browser, but other clients may be used including other browsers, cell phones, personal digital assistants, televisions and game consoles.

In yet an alternative applicable to any of the embodiments described herein, information regarding the delivery date and delivery location of the physical out-of-band communication may be incorporated into the challenge. Accordingly, some of the possible attacks to the proposed scheme would be defeated. Furthermore, the systems may defend against brute force attacks. While the challenge/response pairs may be complex and in a sparse space, an attacker may still attempt to scan the protected web site by trying all combinations of challenge strings to attempt to obtain the matching responses. Accordingly, as an alternative, the system employs a self verifiable challenge string by adding a digital signature or Message Authentication Code (MAC). Furthermore, typical denial of service countermeasure type defenses can be employed such as by shutting down access to known attacking addresses.

Several illustrative embodiments described utilize a third party Mail Production Facility 30 for printing statements, calculating challenge/response data and creating mail pieces for induction into the USPS delivery system. In an alternative applicable to any of the embodiments described herein, the electronic commerce vendor 40 may incorporate those functions.

In yet an alternative system, similar methods for authenticating a web server to a potential customer user may be provided even in the situation where there is no previous relationship between the user and the electronic commerce web site. For example, in the embodiments above, the user authenticates the C/R pair communication received in the physical channel to some degree of trust based upon the previous relationship with the vendor and based upon other items in the communication such as known charges on accredit card bill or known telephone calls made by the use printed on the telephone statement along with a C/R pair. The systems above that deal with a single vendor such as a credit card company providing C/R pairs for third party vendors would alleviate some of these concerns as long as there is a reasonable level of trust between the user and the main vendor and then a reasonable level of trust between the main vendor and the other vendors that subscribe to the third party C/R service. The unsolicited C/R pair received by mail is still more trustworthy than a C/R pair received by email due to the costs associated with mail and the penalties associated with mail fraud.

Accordingly, the user may accept a lower level of trust if they are not able to completely authenticate the C/R pair received in a solicitation from a new vendor or merchant that he does not have a relationship with. However, in an alternative, the new relationship vendor may offer a service in which the user requests a C/R pair using an out-of-band channel such as by entering a known trustworthy establishment such as a bank and requesting a C/R pair there in person. In this method, the user could then afford a greater level of trust to the C/R pairs received after making such a trusted request. In a further challenge response handshake, the user might additionally receive a response at the bank to expect in the mailing containing the requested C/R pair. Such methods may advantageously be utilized with any of the systems and methods described herein. An electronic commerce vendor may provide challenge and/or response data to a potential customer by sending a direct mailing to the customer. In one configuration, each set of the challenge and/or response data is associated with a particular potential customer.

In illustrative alternative embodiments, the web site uses a login or cookie to identify the user and thus does not request a challenge code but merely displays the response data when the user navigates to the site. In such an embodiment, the responses are generated in some manner, possibly randomly and associated at the web site with a customer identifier. When the customer logs, the web site looks up response data and displays it. The response data could be a random string or photo or even a user selected photo. While many embodiments described above utilize large numbers of C/R pairs that are not associated with a particular customer, it is possible to use simpler C/R pairs or just response data if the user is required to log in securely and the response data is associated with the user.

If an inconsiderate potential customer or group of customers were to maliciously publish the challenge and/or response data for a web site, or if a large scale physical delivery interception was perpetrated, a rouge site might dupe that many other people. Such situations may be dealt with by disabling such authentication data when it is discovered to be compromised or by using geocode data to ensure that the challenge data is coming from the appropriate location even though the particular potential customer is not known by adding a geography based attribute to the C/R pair having reasonable resolution. Similarly, the C/R pairs may time out so that time based security may be implemented.

Even if a fraudulent web site were to attempt to employ such a scheme in a Phishing attack such as by using a mailing with a close to correct URL and seemingly authentic pirate web site that would respond correctly to a fraudulent challenge/response set received in the mail, several characteristics of the authentication system work to protect the users of the system. Implementing such an identity theft Phishing attack would entail using the physical mail which is considerably more expensive than email attacks. Similarly, there are severe federal criminal penalties imposed for misusing the USPS mail system.

While several embodiments of the invention have been described and illustrated above, it should be understood that these are exemplary of the invention and are not to be considered as limiting. Additions, deletions, substitutions, and other modifications can be made without departing from the spirit or scope of the present invention. For example, other known challenge/response information architectures may be substituted for those described above. Accordingly, the invention is not to be considered as limited by the foregoing description but is only limited by the scope of the appended claims.

What is claimed is:

1. A computer implemented for authenticating a web site by a user using an in-band electronic communications channel and authentication comprising:
   receiving a physical communication including web site authentication data including challenge data and response data through an out-of-band physical delivery communications channel;
   then connecting a user client running on the computer to the web site; then, by using the user client, sending the challenge data to the web site using the in-band electronic communications channel, wherein the user does not provide authentication information to the web site before sending the challenge data; then receiving reply response data from the web site using the user client and the in-band electronic communications channel; and
   displaying by the user client the reply response data for authenticating the website.

2. The method of claim 1 wherein the out-of-band physical delivery channel is the United States Postal Service system, and wherein the challenge data comprises the delivery location of the physical communication.

3. The method of claim 1 wherein the web site is controlled by an entity and the communication is a statement from the web site controlling entity and wherein the challenge data comprises the delivery date of the physical communication.

4. The method of claim 1 wherein the web site is controlled by a first entity and the physical communication is a statement from a financial institution including a charge from the web site controlling entity, wherein the physical communication response data is printed near the charge, and
   wherein the communication further includes second challenge data and second response data associated with a second entity having a second website and wherein the financial institution is a third entity.

5. The method of claim 1 wherein the communication includes communication authentication indications.

6. A computer implemented method for providing web site authentication data to a user in response to a challenge from the user using an in-band electronic communications channel comprising:
   sending a physical communication including web site authentication data including challenge data and response data through an out-of-band physical delivery communications channel to the user;
   then receiving a challenge selected from the challenge data from the user through the in-band communications channel using the computer, wherein the user does not provide authentication information to the web site before sending the challenge data;
   then determining, using the computer, the appropriate response data associated with the challenge authentication data received from the user; and then sending, using the computer, the determined reply response data to the user using the in-band electronic communications channel.

7. The method of claim 6 wherein the out-of-band delivery channel is the United States Postal Service system, and wherein the challenge data comprises the delivery location of the physical communication.

8. The method of claim 6 wherein the web site is controlled by an entity and the communication is a statement from the web site controlling entity, and wherein the challenge data comprises the delivery date of the physical communication.

9. The method of claim 6 wherein the web site is controlled by a first entity and the physical communication is a statement from a financial institution including a charge from the web site controlling entity, wherein the physical communication response data is printed near the charge, and wherein the communication further includes second challenge data and second response data associated with a second entity having a second website and wherein the financial institution is a third entity.

10. The method of claim 6 further comprising:
   obtaining pre-computed response data associated the challenge from a third party for use in providing reply response data in response to the challenge.

11. The method of claim 6, further comprising, then authenticating the user wherein the user is authenticated to the web site.

* * * * *